US012735203B2

(12) United States Patent
Song

(10) Patent No.: US 12,735,203 B2
(45) **Date of Patent: *Sep. 15, 2026**

(54) SYSTEMS AND METHODS FOR SECURING AN UPRIGHT ROCKET

(71) Applicant: Blue Origin Manufacturing, LLC, Huntsville, AL (US)

(72) Inventor: Weidong Song, Woodinville, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/894,801

(22) Filed: Sep. 24, 2024

(65) Prior Publication Data

US 2025/0108941 A1 Apr. 3, 2025

Related U.S. Application Data

(63) Continuation of application No. 17/557,956, filed on Dec. 21, 2021, now Pat. No. 12,103,716.

(51) Int. Cl.
*B64G 5/00* (2006.01)
*B63B 35/50* (2006.01)

(52) U.S. Cl.
CPC ................ *B64G 5/00* (2013.01); *B63B 35/50* (2013.01); *B64G 2005/005* (2013.01)

(58) Field of Classification Search
CPC .... B63B 35/50; B64F 1/029; B64G 2005/005
USPC ........................................................ 244/110 C
See application file for complete search history.

(56) References Cited

U.S. PATENT DOCUMENTS

| | | | |
|---|---|---|---|
| 2,807,429 | A | 9/1957 | Hawkins et al. |
| 3,053,479 | A | 9/1962 | Seigel et al. |
| 3,295,790 | A | 1/1967 | Webb |
| 3,309,044 | A | 3/1967 | Strance et al. |
| 4,604,938 | A | 8/1986 | Kennedy et al. |
| 5,667,167 | A | 9/1997 | Kistler |
| 5,873,549 | A | 2/1999 | Lane et al. |

(Continued)

FOREIGN PATENT DOCUMENTS

| | | |
|---|---|---|
| FR | 3088894 | 5/2020 |
| GB | 2172247 | 9/1986 |

(Continued)

OTHER PUBLICATIONS

Ishijima et al. Re-entry and Terminal Guidance for Vertical-Landing TSTO (Two Stage to Orbit). A Collection of Technical Papers. Part 1. AIAA Guidance, Navigation, and Control. Conference and Exhibit. Aug. 10-12, 1998, Boston, MA. American Institute of Aeronautics and Astronautics. pp. 192-200.

(Continued)

*Primary Examiner* — Bradley Duckworth
(74) *Attorney, Agent, or Firm* — Knobbe, Martens, Olson & Bear, LLP

(57) ABSTRACT

Systems and methods for securing an upright rocket. The rocket may be on a moveable platform, such as a landing area of a ship. The rocket may land on the deck, and the system may include cables that surround the landing area. The cables may be tightened about the rocket after the rocket has landed in an upright position. The system may include poles that telescope upward, such that the cables may tighten about the upright rocket at various heights along the body of the rocket.

19 Claims, 4 Drawing Sheets

(56) References Cited

U.S. PATENT DOCUMENTS

| | | | |
|---|---|---|---|
| 5,927,653 A | 7/1999 | Mueller et al. | |
| 6,024,006 A | 2/2000 | Kindem et al. | |
| 6,176,451 B1 | 1/2001 | Drymon | |
| 6,450,452 B1 | 9/2002 | Spencer et al. | |
| 6,874,729 B1 | 4/2005 | McDonnell | |
| 7,097,137 B2 | 8/2006 | McDonnell | |
| 8,047,472 B1 | 11/2011 | Brand et al. | |
| 8,498,756 B1 | 7/2013 | Sarver | |
| 8,678,321 B2 | 3/2014 | Bezos et al. | |
| 10,093,433 B2 | 10/2018 | Knudsen et al. | |
| 10,252,819 B2 | 4/2019 | Knudsen et al. | |
| 10,597,173 B2 | 3/2020 | Knudsen et al. | |
| 10,800,545 B2 | 10/2020 | McDonnell | |
| 10,822,122 B2 | 11/2020 | Grose et al. | |
| 11,059,610 B2 | 7/2021 | Knudsen et al. | |
| 11,738,890 B2 | 8/2023 | Knudsen et al. | |
| 12,103,716 B2 * | 10/2024 | Song | B63B 35/50 |
| 12,515,823 B2 | 1/2026 | Grillos, II et al. | |
| 2007/0012820 A1 | 1/2007 | Buehler | |
| 2016/0311556 A1 | 10/2016 | Knudsen et al. | |
| 2018/0044035 A1 | 2/2018 | McDonnell | |
| 2018/0178930 A1 | 6/2018 | Grose et al. | |
| 2019/0055035 A1 | 2/2019 | Knudsen et al. | |
| 2020/0024009 A1 | 1/2020 | Knudsen et al. | |
| 2020/0367643 A1 | 11/2020 | Fu | |
| 2021/0009288 A1 | 1/2021 | Knudsen et al. | |
| 2021/0047058 A1 | 2/2021 | Nawojczyk | |
| 2022/0135259 A1 | 5/2022 | Knudsen et al. | |
| 2023/0192327 A1 | 6/2023 | Song | |
| 2023/0339628 A1 | 10/2023 | Grillos, II et al. | |
| 2024/0253824 A1 | 8/2024 | Grillos, II et al. | |

FOREIGN PATENT DOCUMENTS

| | | |
|---|---|---|
| WO | WO 2017/142117 | 8/2017 |
| WO | WO 2019/021036 | 1/2019 |

OTHER PUBLICATIONS

OctaGrabber Compendium. By Scr00chy. Published Mar. 19, 2019. Updated Jun. 16, 2020 Retrieved Jun. 29, 2020. www.elonx.net. octagrabber. pp. 1-16.

Solid Rocket Boosters and post-launch processing. Nasa Facts. John F. Kennedy Space Center. Kennedy Space Center, Florida 32899. 17 pages. 2004.

Waters et al. "Test Results of an F/A-18 Automatic Carrier Landing Using Shipboard Relative GPS." Proceedings of the ION 57th Annual Meeting and the CIGTF 20th Biennial Guidance Test Symposium. Jun. 11-13, 2001. The Institute of Navigation. pp. 841-851.

* cited by examiner

SYSTEMS AND METHODS FOR SECURING AN UPRIGHT ROCKET

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. For example, this application is a continuation of U.S. application no. 17,557,956 filed on Dec. 21, 2021 and titled SYSTEMS AND METHODS FOR SECURING AN UPRIGHT ROCKET, the entire content of which is incorporated by reference herein in its entirety and forms a part of this specification for all purposes.

BACKGROUND

Field

This development relates to rockets, in particular to securing upright rockets.

Description of the Related Art

Rockets are used for many applications, including launching vehicles to space. Due to their relatively longer length compared to their width, upright rockets are unstable and risk toppling over when exposed to certain lateral loading conditions. Such loads may be due to wind, contact by external structures, and/or gravitational loads imposed due to movement of the structure supporting the upright rocket. This is especially true for rockets that land on moving platforms, such as ships at sea. It is therefore desirable to be able to secure rockets in these and other contexts.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description" one will understand how the features of the embodiments described herein provide advantages over existing approaches to securing upright rockets.

Systems and methods are described herein for securing an upright rocket. The rocket may be on a moveable platform, such as a landing area on a deck of a ship. The rocket may land on the deck, and the system may include cables that surround the landing area. The cables may be tightened about the rocket after the rocket has landed in an upright position. The system may include poles that telescope upward, such that the cables may tighten about the upright rocket at various heights along the body of the rocket. Advantageously, the system may reduce risks associated with rocket landing and offer opportunity for mass reduction and simplification of rocket design.

In one aspect, a system for securing an upright rocket is described. The system comprises a platform, a plurality of poles, and a plurality of cables. The platform is configured to be located at sea, where a landing region of the platform is configured to support the rocket in an upright position after the rocket lands on the landing region. The plurality of poles are attached to the platform and located around the landing region. Prior to the rocket landing, the plurality of cables are configured to enclose the landing region with each cable extending from a first pole of the plurality of poles around the landing region and to a second pole of the plurality of poles that is adjacent to the first pole. With the upright rocket located on the landing region of the platform, the plurality of cables are configured to be retracted and to tighten about the upright rocket.

Various embodiments of the above and other aspects may be implemented. The plurality of poles may be configured to telescope upward. One or more of the plurality of cables may move upward as the plurality of poles telescope upward. The one or more of the plurality of cables may extend from a location of a respective pole that is located vertically above the platform. The one or more of the plurality of cables may extend from an upper end of the respective pole. The plurality of poles may comprise four poles. The plurality of cables may comprise two cables. The two cables may each connect with an upper end of a telescoping portion of a respective pole. The plurality of cables may comprise four cables. Two of the four cables may be located vertically above the other two of the four cables after tightening about the rocket. The plurality of poles may comprise a first, a second, a third, and a fourth telescoping pole, and the plurality of cables may comprise a first, a second, a third, and a fourth cable. The first and second cables may be coupled with the first pole and the second pole, and the third and fourth cables may be coupled with the third pole and the fourth pole.

In another aspect, a system for securing an upright rocket is described. The system comprises a platform, a plurality of poles, and a plurality of cables. A region of the platform may be configured to support the upright rocket. The plurality of poles may be located around the region. Prior to the upright rocket being located on the region, each cable may extend from one of the plurality of poles around the region to another of the plurality of poles. After the rocket is located on the region, the plurality of cables are configured to be retracted and to tighten about the upright rocket.

Various embodiments of the above aspects and other aspects may be implemented. Portions of the plurality of poles may be configured to extend upward. After the plurality of cables are retracted and tightened about the upright rocket, one or more of the plurality of cables may be located vertically above one or more other of the plurality of cables. The plurality of poles may comprise four or more poles, and the plurality of cables may comprise two or more cables.

Any of the systems may further comprise one or more elastic support cords attached to one or more of the poles and to one or more of the cables, where the elastic support cords are configured to locate the cables about the landing region and to lengthen or stretch inwardly as the cables are retracted about the rocket.

In another aspect, a method of securing a rocket on a platform is described. The method comprises positioning cables around a landing region of the platform, landing the rocket on the landing region of the platform, and tightening the cables about a body of the rocket after the rocket has landed. In some embodiments, the method may further comprise telescoping a plurality of poles upward after the rocket has landed, wherein the cables are attached to one or more of the plurality of poles. In some embodiments, the method may further comprise applying a first force on the upright rocket in a first lateral direction and applying a second force on the upright rocket in an opposite second lateral direction due to tightening the cables about the body of the rocket. In some embodiments, the method may further comprise moving the platform from a port to a first location of the sea on a ship, and moving the platform away from the first location of the sea after tightening the cables about the body of the rocket.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

Figure 1:
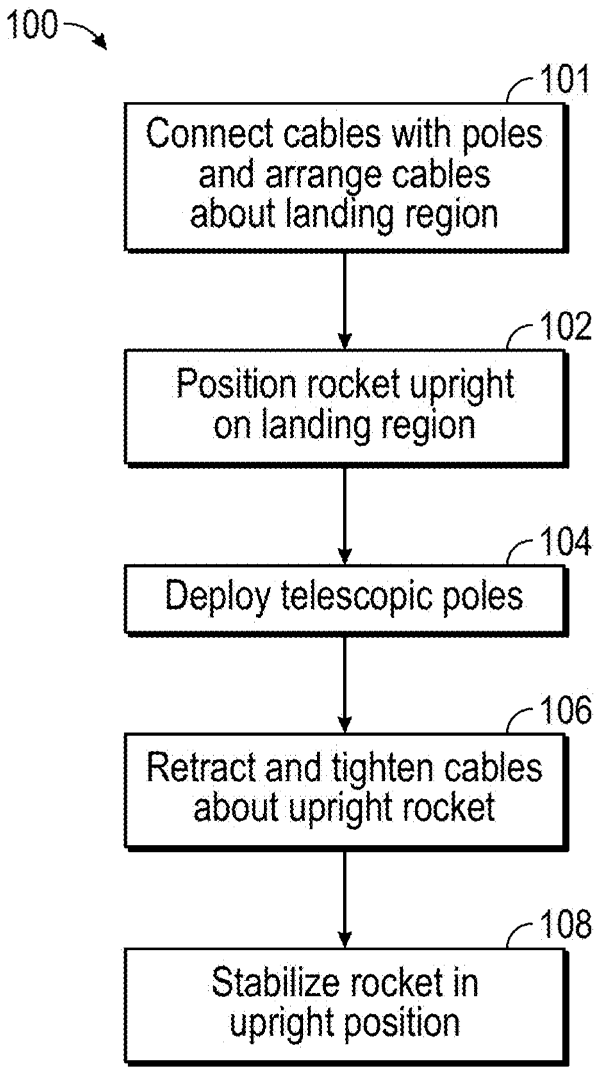
FIG. 1 is a flow chart illustrating an example process of securing an upright rocket using a cable and pole based system.

The following detailed description is directed to certain specific embodiments of the development. Reference in this specification to "one embodiment," "an embodiment," or "in some embodiments" means that a particular feature, structure, or characteristic described in connection with the embodiment is included in at least one embodiment of the present disclosure. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others.

Various embodiments will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the development. Furthermore, embodiments of the development may include several novel features, no single one of which is solely responsible for its desirable attributes or which is essential to practicing the present disclosure.

In some examples, a rocket may be configured to land on a ship platform in typical as well as adverse conditions. A ship underway under typical sea conditions will move in six degrees of motion: three linear motions (heave, sway, surge) and three rotational motions (roll, pitch and yaw). Adverse conditions or unexpected forces, such as wind, waves, and swell may cause unexpectedly large movements of the ship or platform. In some embodiments, the ship may be moving forward while the rocket travels downward and forward to land on the forward-moving platform of the ship. Movement of the ship platform can pose challenges in keeping a rocket stable and safe when landing, mounted, or otherwise set or placed on the platform. Some solutions to securing a rocket to a moving platform involve complicated adjustment of rocket landing legs or anchoring the landing legs to the platform or deck. However, those solutions can involve considerable amount of risk in relation to the landing process due to their complicated nature. Additionally, the dynamic loads on the rocket, platform, and/or securing mechanism due to the movement of the ship can also impose a challenge in relation to the structural integrity of the rocket body if the legs are anchored firmly to the deck. Advantageously, example systems and methods disclosed herein may reduce technical complexity of securing a rocket to a moving platform and accordingly reduce associated risks.

Systems and methods disclosed herein relate to securing a rocket on a moving platform. In some examples, securing systems and methods may include a deployable pole and cable based system to secure a rocket on a deck or platform. In some examples, a plurality of cables may be extended, retracted, and tightened at one or more heights along an upright rocket in order to secure the rocket in an upright position on a platform. For example, a plurality of cables (for example, four) may be laid loosely on a deck or platform. In some examples, the plurality of cables may be laid onto and rest on the deck or platform prior to the landing or placement of the rocket on the deck or platform. While the rocket is landing on the deck, a plurality of telescopic poles (for example, four) may deploy from a stowed position below the platform, or otherwise be erected to a deployed height or a plurality of deployed heights. The plurality of telescopic poles may be arranged around the rocket, such as circumferentially around the rocket or at four corners of a deck or platform. The plurality of telescopic poles may be configured to carry the plurality of cables to one or more desired heights. After the rocket lands on or otherwise contacts the deck or platform, the plurality of telescopic poles may be configured to at least partially retract the cables so that the cables engage one or more sections of the rocket. The plurality of cables may be tightened around the rocket body to one, two or more separate heights in reference to the deck or platform. Thus, a rocket may be secured in an upright position at one, two, three, four or more locations along the length of the rocket using a plurality of cables attached to a plurality of telescopic poles located around the rocket.

Advantageously, the various embodiments of a securing system such as described herein may greatly reduce the moment applied to the rocket body and landing legs due to ship movement. Accordingly, the securing system may improve the reusability of the rocket as it may lessen stressors on mechanical aspects of the rocket body. Additionally, use of the securing system may facilitate simplification of a rocket landing leg system by reducing the number of landing legs and the associated hydraulic system, leading to a lighter rocket and more reliable landing legs. Additionally, longevity and reusability of the landing deck or platform itself may be improved because damage due to anchoring through the deck may be reduced (which may be a problem for other solutions). Particular example embodiments of these systems and methods will now be described with reference to the accompanying drawings.

FIG. 1 illustrates an embodiment of a process 100 for securing a rocket in an upright position according to the present disclosure. The process 100 begins with step 101 where one or more cables, also referred to herein as securement cables, are connected to one or more poles and arranged about a landing region. Portions of the cables extending away from the poles may be laid on the deck or other platform around the landing region configured to receive an upright rocket thereon. Each cable may be attached to two poles at opposite ends of the cable. There may be four cables and four poles, or other configurations, as described herein. In some embodiments, the cables may already be connected with the poles, in which case step 101 may be skipped.

The process 100 then proceeds to step 102, where the rocket or other vehicle may land or be otherwise placed upright on the landing region of the platform. In some examples, the rocket or other vehicle may include, but is not limited to, at least a portion of a launch vehicle or rocket-propelled vehicle configured to carry a payload to space. In some examples, a platform may include, but is not limited to, a ship deck, floating platform, or other moving or movable platform or surface configured to receive the rocket or other vehicle. In some examples, a rocket or other vehicle may land on the platform using a form of landing that may include, but is not limited to, a vertical landing or other landing that makes use of a vehicle's thrusters to land the vehicle on the platform. In some embodiments, step 102 may occur before, during, or after step 104 described below.

The process 100 then proceeds to step 104, where one or more poles extend upward in a direction away from the landing region. The poles may be telescopic or non-telescopic. The poles may include structures that extend or deploy in a vertical direction in any suitable manner. As one non-limiting example, a moveable pole or moveable portion of a pole may extend upward away from a vertically stationary pole or stationary portion of a pole. In some examples, the poles may include, but are not limited to, poles that telescope upward from a rest state below their maximum height. For example, one or more poles may be positioned partially or entirely below a plane of the platform or deck, and then the one or more poles may be extended partially or entirely above the plane of the platform or deck. The poles may be in the stowed position prior to the rocket landing and then deployed after landing of the rocket. In some embodiments, the poles may be deployed prior to, during, or after the rocket landing. Thus steps 102 and 104 may have overlap, or may be performed out of order. In some embodiments, the poles may already be deployed or be permanently deployed, such as with fixed length columns in place of the moveable poles. In such cases, step 104 may be skipped. In another example, one or more poles may be extended from a resting state or position that is on or above the plane of the platform or deck. The poles may extend linearly and/or rotate to the deployed position. In some examples, the poles may be deployed using an actuator, which may include, but is not limited to a motor, hydraulic mechanism, or spring mechanism.

In some examples, one or more poles may be configured to hold or contain or attach to at least a portion of at least one cable. As the one or more poles are deployed, at least a portion of the cable(s) may be raised to one or more heights above the platform. In some embodiments, the cables may already be raised, for example where the poles are already extended or where fixed length columns are used. The cables may be attached to the poles using brackets, pulleys, or other suitable mechanisms.

In some embodiments, elastic tension cords or cables may be used to support the cables. The elastic cords may be attached along the length of the securement cables. The elastic cords may locate the securement cables in an open configuration, e.g. square, in order to clear the landing region of the rocket. The elastic cords may also support the securement cables in an elevated position. The elastic cords may be configured to stretch in length as the securement cables are retracted about the rocket in step 106.

The process 100 then proceeds to step 106, where one or more of the cable(s) are retracted and tightened about the upright rocket. In some examples, the cables may retract simultaneously, before, or after the one or more poles deploy. In some examples, the cables may be retracted using a retraction mechanism separate from the pole deployment mechanism or as part of the pole deployment mechanism. In some examples, a subset of the cables or cable ends may be retracted. In some examples, the totality of the cables or cable ends may be retracted. The cables may be pulled toward the respective pole or poles to which they are attached. Any elastic cords used to support the cables may stretch or lengthen and be pulled inward by the retracting cables. A securing system may tighten the one or more cable(s) associated with the one or more poles to secure the rocket. In some examples, the cables may be retracted so as to tighten around the rocket with approximately equivalent forces at contact points along the length of the rocket so as to secure the rocket in an upright position with respect to the platform such that the rocket is perpendicular to the platform on which it lands. The rocket may be approximately upright, such that a longitudinal axis of the rocket and the vertical direction relative to the platform forms an angle of less than 30° (degrees), less than 20° or less than 10°. The cables may encircle the rocket body at one or more vertical locations along the axial length of the rocket body. The height of the cables about the rocket may be based on the heights of the cables' attachment locations to the poles. A first cable attached to at a first relatively higher position of an upwardly extended pole may encircle the rocket at a first relatively higher location of the rocket, and a second cable attached to a second relatively lower position of the upwardly extended pole may encircle the rocket at a second relatively lower location of the rocket.

The process 100 then proceeds to step 108 where the rocket is stabilized in an upright position. The cables may be fixed in their retracted and tightened position. A clamp or other lock may secure the cables and prevent the cables from paying out. In some embodiments, other mechanical supports may be used to support the rocket, for example at the base of the rocket or elsewhere.

Figure 2A:
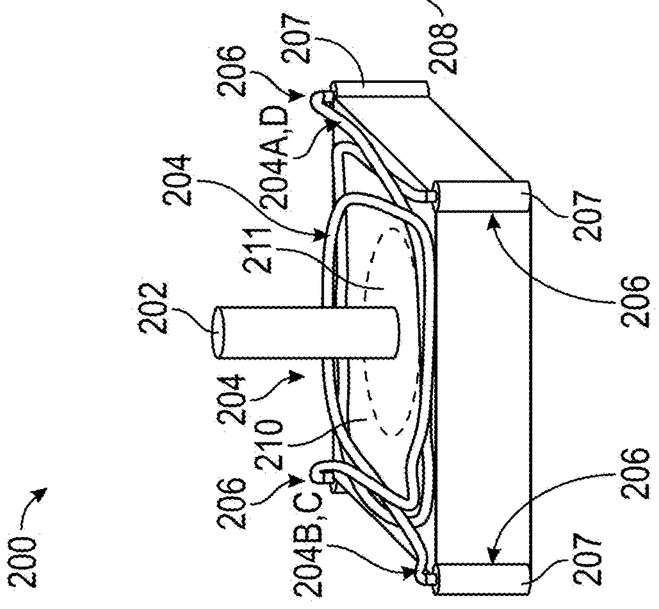
FIGS. 2A-2C are sequential perspective views of an embodiment of a system for securing an upright rocket that may be used to perform the method of FIG. 1.
Figure 2B:
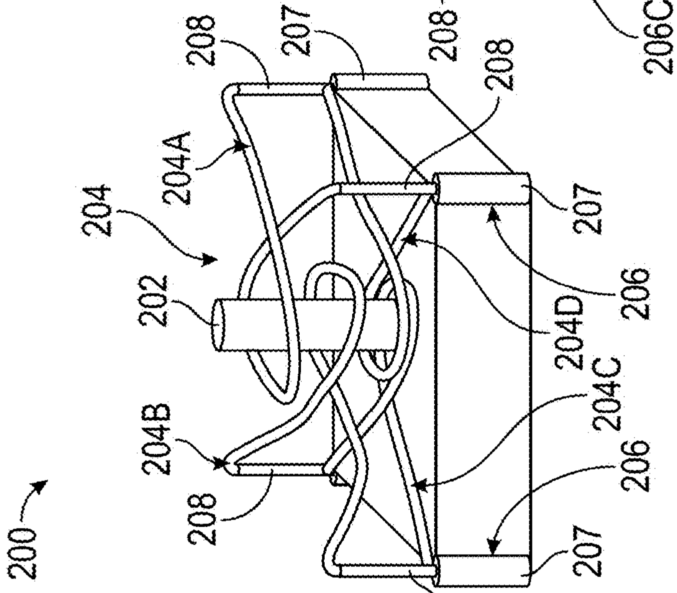
Figure 2C:
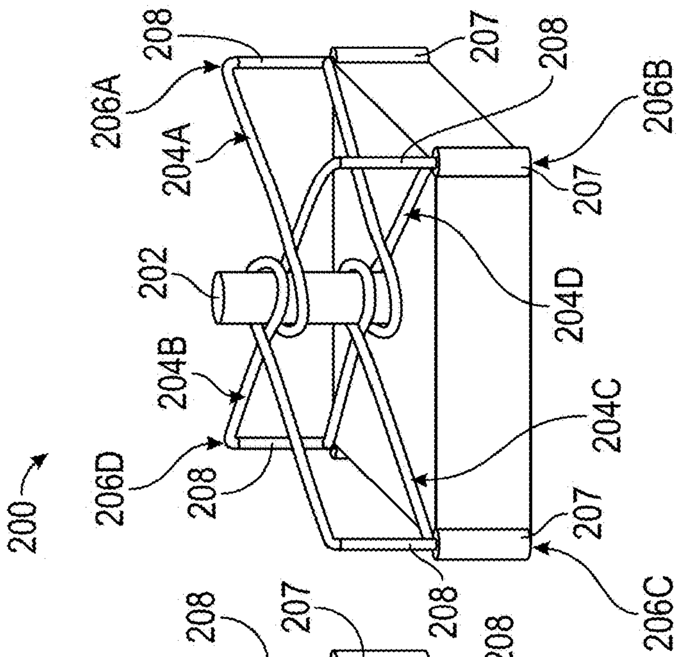

FIGS. 2A-2C are sequential perspective views of an embodiment of a system 200 for securing an upright rocket 202 on a platform 210 according to the present disclosure. The system 200 may perform the process 100 described with reference to FIG. 1.

FIG. 2A illustrates a first state of the securing system 200 wherein the rocket 202 has initially landed or is in the process of landing on a landing region 211 of the platform 210. The landing region 211 may be a portion of the upper surface of the platform 210, such as an indicated landing spot configured to receive the rocket 202 vertically thereon. The platform 210 may be a ship, a portion of a ship, or a landing platform on or otherwise attached with a ship. In some embodiments, the ship, and therefore the platform 210, may be travelling in a first horizontal direction, such as a forward direction, while the rocket 202 is landing on the ship. The ship may propel itself forward using its engines and propellers. Such forward movement of the ship may allow for reduced rotational movement of the ship and platform 210. These rotational movements may be caused by forces acting on the ship, for example forces from waves and wind at sea. The forward movement of the ship may mitigate the effect of such forces on the rotational movement of the ship and platform 210. In embodiments where the ship is moving forward, the rocket 202 may travel downward and forward to land on the forward-moving landing region 211. This may simplify control of the landing rocket, among other advantages. For example, the descending rocket may have two velocity components, one in the vertical direction and one in the horizontal direction. If the rocket lands on a moving platform that has a horizontal velocity which matches the rocket's horizontal velocity, then the control maneuvers of the rocket need only account for the vertical component of the rocket's velocity. It is therefore easier to control the rocket, and the propellant consumption for landing can be greatly reduced. Further, the platform 210 may be any landing deck or other structure having the landing region 211 on which the rocket 202 is intended to be received in an upright orientation, whether at sea or on land. Thus, it will be understood that implementations of the present disclosure are not limited to securing a rocket at sea, and can be suitably implemented in other contexts, such as landing a rocket on a land-based landing pad during strong or erratic wind conditions. The rocket 202 may be a reusable booster used in a first stage of launching an orbital vehicle to space.

The system 200 includes a plurality of pole assemblies 206. As shown, there are four pole assemblies 206A, 206B, 206C, 206D. There may be two, three, five, six, seven, eight, nine, ten or more pole assemblies 206. The pole assemblies 206 include a stationary pole 207 and a moveable pole 208. As shown, the moveable pole 208 translates linearly upwards from the stationary pole 207. The moveable pole 208 telescopes away from the stationary pole 207. The moveable pole 208 is located inside the stationary pole 207 in a stowed configuration. In some embodiments, the moveable pole 208 may be located adjacent the stationary pole 207. In some embodiments, the pole assembly 206 may not include a moveable component. For example, the pole assembly 206 may be fixed at a particular height. The stationary pole 207 and moveable pole 208 may be two portions of a single pole, or two separate poles. In some embodiments, the moveable pole 208 may move upward in other suitable manners, such as rotating away from the stationary pole 207. For example, the pole assembly 206 may be folded at a pivot point, and a portion of the pole assembly 206 may rotate about the pivot point to cause the length of the pole assembly 206 to be extended upward.

As shown in FIG. 2A, in the first state, the plurality of telescopic poles 208 may be initially vertically retracted at a first height, for example stowed inside the stationary pole 207. The pole assemblies 206 may be located around the rocket 202, such as at corners of the landing platform 210. The stationary pole 207 may be a portion of the platform 210, such as corners thereof. Alternatively, the stationary pole 207 may be built into or embedded within a deck that includes the platform 210. The telescopic poles 208 are configured to extend vertically upward from the stationary pole 207 to a second height that is higher than the first height, as further described. The pole assemblies 206 or portions thereof may be formed of metal, composite, polymers, plastics, other suitable materials, or combinations thereof.

One or more cables 204, also referred to herein as securement cables, may be attached to one or more of the pole assemblies 206. In some embodiments, the cables 204 may include four cables 204A, 204B, 204C, 204D as shown. There may be two, three, five, six, seven, eight, nine, ten or more of the cables 204. The cables 204 may each be attached to two of the pole assemblies 206. In a first state of the securing system 200 corresponding to step 101 of FIG. 1, the cables 204 are in a starting position. In the starting position, each of the cables 204 may each be arranged or laid down around the landing site of the rocket 202 on the platform 210 so as to loosely loop around and surround the landing region 211. For example, the cables 204 can rest loosely in contact with the platform 210 and each other in this first state. In some examples, the cables 204 may be laid flat along at least one edge, or two, three or four edges, of the platform 210 so as to avoid interference with a landing of the rocket 202. The cables 204 may be formed of flexible material such as rope, other suitable materials, or combinations thereof. The cables 204 may be substantially inelastic such that they will not stretch under stresses due to lateral forces acting on the rocket 202.

As best seen in FIG. 2C, a single cable 204 may be attached to two pole assemblies 206 that are attached to or otherwise located at adjacent corners of the platform 210. For example, the first and fourth cables 204A, 204D are attached at first ends thereof to a first pole assembly 206A, extend about the landing region 211 prior to retraction, and are attached at second ends thereof to a second pole assembly 206B that is adjacent to the first and third pole assemblies 206A, 206C and located across from the fourth pole assembly 206D. The first cable 204A attaches to the respective moveable pole 208 and is, at least after extension of the first pole assembly 206A, located vertically higher than the fourth cable 204D, which may attach to the respective stationary pole 207 or to a lower portion of the moveable pole 208. The second and third cables 204B, 204C are attached at first ends thereof to a third pole assembly 206C that is located across from the first pole assembly 206A and adjacent to the second and fourth pole assemblies 206B, 206D, extends about the landing region 211 prior to retraction, and are attached at second ends thereof to a fourth pole assembly 206D that is located across from the second pole assembly 206B and adjacent to the first and third pole assemblies 206A, 206C. The second cable 204B attaches to the respective moveable pole 208 and is, at least after extension of the first pole assembly 206A, located vertically higher than the third cable 204C, which may attach to the respective stationary pole 207 or to a lower portion of the moveable pole 208.

In some embodiments, different ends of the cables 204 may be attached to the same or different pole assemblies 208. Further, in some embodiments, ends of the cables 204 may be attached to pole assemblies 206 that may not be adjacent to each other. For instance, the first cable 204A may extend from the first pole assembly 206A to the second, third, and/or fourth pole assemblies 206B, 206C, 206D. One or more of the pole assemblies 206 may include pulleys through which the cables 204 extend to provide support to the system 200, while one or more of the pole assemblies may include terminal attachments where the cable 204 ends and is secured thereon. The other cables 204 may be similarly configured.

FIG. 2B illustrates a second state of the securing system 200 wherein the pole assemblies 206 are deployed upward to a deployed position from a starting position. The cables 204 are at least partially retracted. The plurality of moveable poles 208 may be raised vertically above the surface of the landing region 211 of the platform 210. In some embodiments, each of the top ends of the moveable poles 208 may be raised to a height above the center of gravity of the rocket 202. In some examples, the raised height of the moveable poles 208 may be above the center of gravity of the rocket 202 and lower than the total height of the rocket 202. The moveable poles 208 may be raised to approximately the same height or different heights from each other.

The moveable poles 208 may deploy and then the cables 204 may be retracted thereafter. In some embodiments, the cables 204 may at least partially retract as the moveable poles 208 deploy upward. In some embodiments, the cables 204 may partially retract prior to upward deployment of the moveable poles 208. The upper ends of the moveable poles 208 may be located, prior to upward deployment, at the same, or a lower or higher, vertical height as the landing region 211.

The moveable poles 208 may be deployed upward and retracted downward by a motor or other actuation system. The cables 204 may be retracted toward the respective pole and tightened by a motor or other actuation system, which may be the same or different actuation system as the system controlling movement of the moveable poles 208. In some embodiments, the cables 204 may be retracted into the poles. In some embodiments, a winch or other actuator attached to or near the pole may retract the cables 204. The various retraction mechanisms may be controlled remotely, either manually by a human operator or automatically by a control system. In some embodiments, the cables 204 may be manually retracted, either by hand or by manual operation of a retracting mechanism.

FIG. 2C illustrates a third state of the securing system 200 wherein the cables 204 are tightened and the rocket 200 is fully secured in an upright position. In the illustrated example, the cables 204 may be retracted at the pole assemblies 206 in order to tighten the cables 204 around the rocket 202. In some examples, the cables 204 may be tightened to be held at one or more heights along the height of the pole assemblies 206 so as to secure the rocket 202 at similar heights along the longitudinal length or height of the rocket 202. In some embodiments, the cables 204 and/or rocket 202 may be coated in a material so as to reduce frictional wear or other damaging contact that may result from tightening the cables 204 on the body of the rocket 202. In some examples, the coating may include a rubber or other type of coating.

The cables 204 may tighten at one, two, three, four or more longitudinal heights along the rocket 202. There may be the two upper cables 204A, 204B and the two lower cables 204C, 204D as shown. In some embodiments, there may only be the two upper cables 204A, 204B, or only the two lower cables 204C, 204D. The cables 204 may generally be located at two vertical heights as shown, or they may be at one, three, four or more different vertical heights. With four pole assemblies 206 arranged in a square or rectangle as shown, the cables 204 each provide a lateral stabilizing force in a variety of different directions. For instance, portions of the cables 204A and 204D apply lateral forces to the rocket 202 that are approximately equal and opposite in magnitude and direction as compared to lateral forces applied by correspondingly opposite portions of the cables 204B and 204C, as described in further detail herein, for example with respect to FIG. 3. "Lateral" as used herein refers to a direction generally perpendicular to the longitudinal axis of the upright rocket 202.

Figure 3:
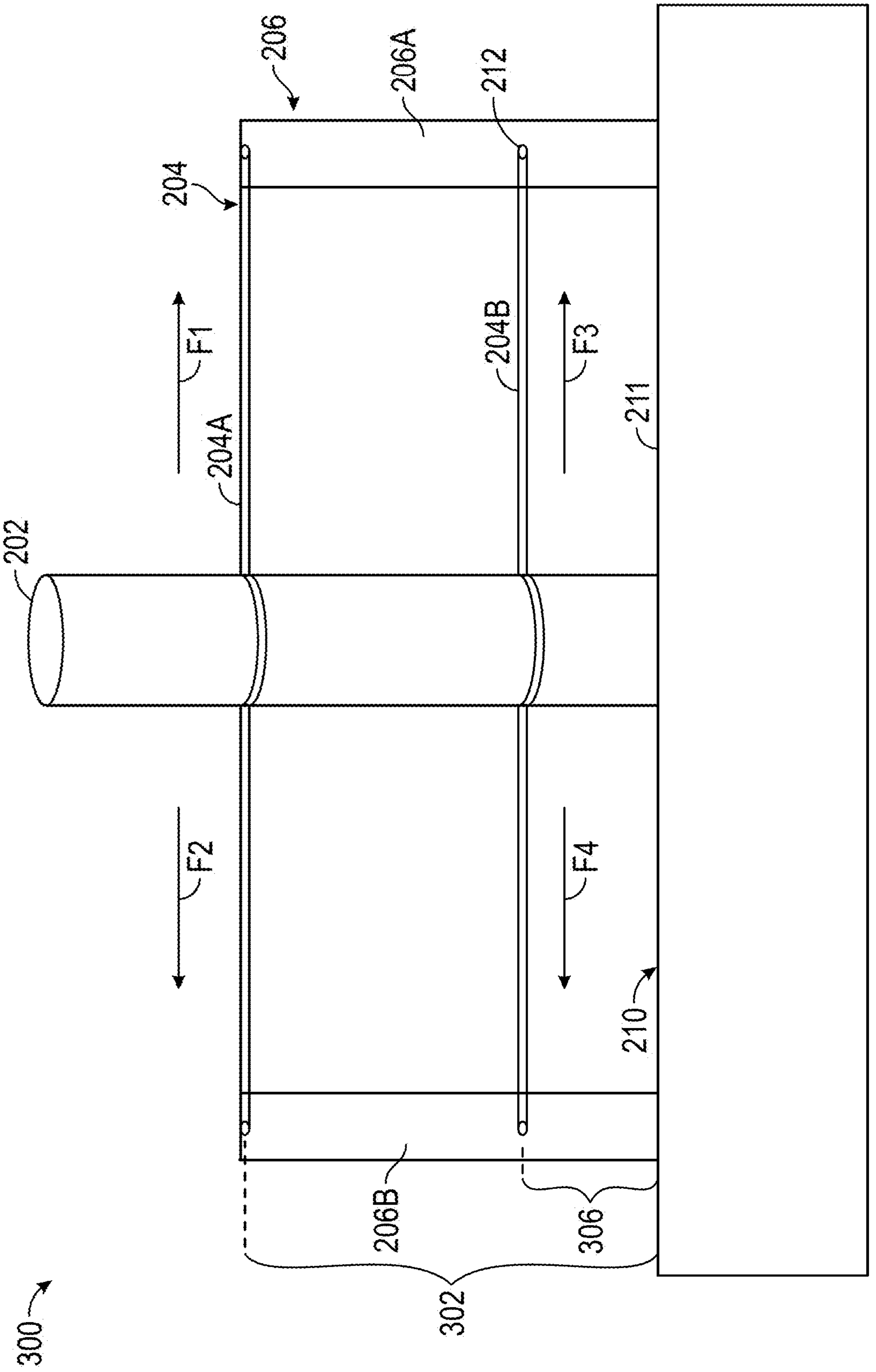
FIG. 3 is a side view of another embodiment of a system for securing an upright rocket that may be used to perform the method of FIG. 1.

FIG. 3 illustrates a side view of another embodiment of a securing system 300. The system 300 may have the same or similar features and/or functions as the system 200, and vice versa. As illustrated in FIG. 3, the rocket 202 is positioned upright on the landing region 211 of the platform 210. The first pole assembly 206A is located across from the second pole assembly 206B. There may be additional pairs of the pole assemblies 206 similarly configured in the system 300. The first cable 204A may be tightened about the rocket 202 and extend from the first pole assembly 206A to the second pole assembly 206B at a first height 302 relative to the landing region 211. The fourth cable 204D may be tightened about the rocket 202 and extend from the first pole assembly 206A to the second pole assembly 206B at a second height 306 relative to the landing region 211. The second height 306 is less than the first height 302. The first height 302 may be located along a height of the rocket 202 that is greater than 50% of the rocket's 202 longitudinal length measured from the landing region 211. The second height 306 may be located along a height of the rocket 202 that is less than 50% of the rocket's 202 longitudinal length measured from the landing region 211. The cables 204 provide lateral stabilization to the rocket 202. The cables 204 may provide lateral stabilization in the directions indicated by the forces F1, F2, F3 and F4. The upper cable 204A provides resistive lateral force F1 and opposite force F2 at the height 302. The lower cable 204B provides resistive lateral force F3 and opposite force F4 at the height 306. The forces F1, F2, F3 and/or F4 may be substantially constant, or they may fluctuate in response to movement of the rocket 202, for example due to the platform 210 moving and/or rotating.

Additional cables 204 may be secured at the same or different heights as the cables 204A, 204B. The cables 204 may be secured or attached at one or more locations 212 along the corresponding pole assemblies 206A, 206B. The one or more locations may be at different heights for different pole assemblies or approximately the same height in reference to the surface of the landing region 210. In some examples, the cables 204 may be configured to be retracted through an opening at the location 212 in the pole assembly 206A. In some examples, one or more of the pole assemblies 206A, 206B may be configured to hold or contain at least a portion of at least one of the cables 204. For example, the pole assembly 204A may have a hollow portion configured to allow at least one of the cables 204 to be contained within the hollow portion. In some examples, a single one of the pole assemblies 206 may be configured to contain two or more of the cables 204.

Figure 4C:
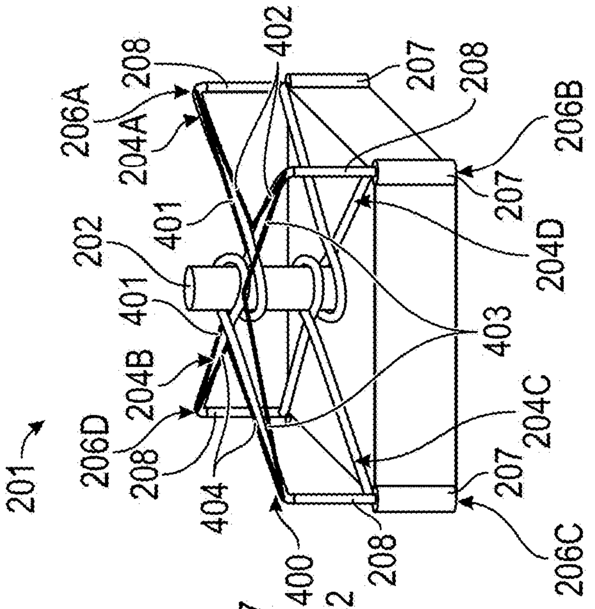
FIGS. 4A-4C are sequential perspective views of another embodiment of a system for securing an upright rocket that may be used to perform the method of FIG. 1.
Figure 4B:
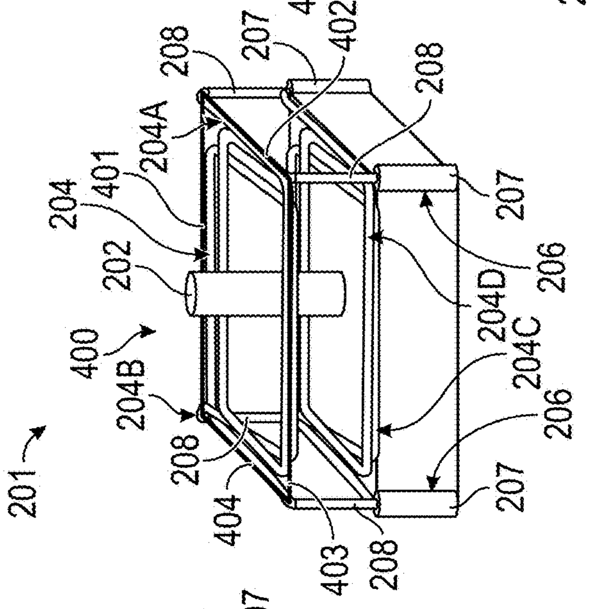
Figure 4A:
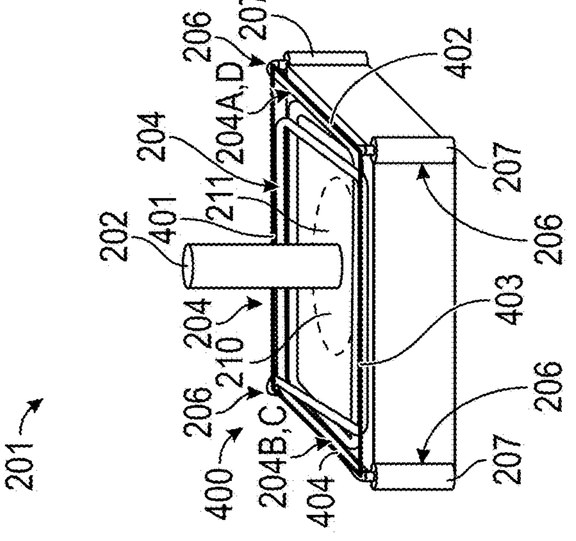

FIGS. 4A-4C are sequential perspective views of another embodiment of a system 201 using an elastic support system 400 to assist the cables 204 in securing the upright rocket 202 on the platform 210. The system 201 shown in FIGS. 4A-4C may perform the process 100 described with reference to FIG. 1. The system 201 may have the same or similar features and/or functions as the system 200, except as described otherwise herein.

The system 201 includes the elastic support system 400. The elastic support system 400 assists with locating the cables 400 before, during and/or after retraction of the cables 400. The system 400 includes elastic cords or cables 401, 402, 403, 404. There may be one, two, three, five, or more of the elastic cables. The elastic cables 401-404 attach to the upper securement cables 204A and 204B. The elastic cables 401-404 may attach to the securement cables 204A, 204B at one or more locations along respective lengths thereof. As shown and as oriented in FIG. 4A, the elastic cable 401 may attach to a rear portion of the securement cables 204A, 204B, the elastic cable 402 may attach to a right portion of the securement cables 204A, 204B, the elastic cable 403 may attach to a forward portion of the securement cables 204A, 204B, and the elastic cable 404 may attach to a left portion of the securement cables 204A, 204B. The respective elastic cables 401-404 may attach to exterior, outward-facing sections of respective securement cables 204A, 204B. As shown in FIG. 4A, before elevation of the pole assemblies 206, the elastic cables 401-404 position the securement cables 204A-D around and away from the landing region 211.

As shown in FIG. 4B, with the pole assemblies elevated, the elastic cables 401-404 will elevate sections of respective securement cables 204A-204D that extend between the elevate pole assemblies. The elevation of the securement cables 204A-204D using the pole assemblies and the elastic support system 400 allows for retraction of the securement cables 204A-204D at an elevated height about the rocket, for example in a plane that is elevated from the platform.

The elastic cables 401-404 may be attached to the securement cables 204A-204D by one or more loops, brackets, pulleys, or other suitable attachments that allow the securement cables 204A-204D to move relative to the elastic cables 401-404 as the securement cables 204A-204D are retracted inward, as shown in FIG. 4C. The elastic cables 401-404 will lengthen, for example stretch, as the securement cables 204A-204D are secured about the rocket 202. In some embodiments, the pole assemblies 206 may already be elevated prior to the rocket 202 landing, as described.

The flow chart sequences are illustrative only. A person of skill in the art will understand that the steps, decisions, and processes embodied in the flowcharts described herein may be performed in an order other than that described herein. Thus, the particular flowcharts and descriptions are not intended to limit the associated processes to being performed in the specific order described.

While the above detailed description has shown, described, and pointed out novel features of the present disclosure as applied to various embodiments, it will be understood that various omissions, substitutions, and changes in the form and details of the device or process illustrated may be made by those skilled in the art without departing from the spirit of the present disclosure. As will be recognized, the present disclosure may be embodied within a form that does not provide all of the features and benefits set forth herein, as some features may be used or practiced separately from others. All changes which come within the meaning and range of equivalency of the claims are to be embraced within their scope.

The term "comprising" as used herein is synonymous with "including," "containing," or "characterized by," and is inclusive or open-ended and does not exclude additional, unrecited elements or method steps. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various embodiments, of ±1%, ±5%, ±10%, or ±20%.

The above description discloses several methods and materials of the present disclosure. The present disclosure is susceptible to modifications in the methods and materials, as well as alterations in the fabrication methods and equipment. Such modifications will become apparent to those skilled in the art from a consideration of this disclosure. Consequently, it is not intended that the present disclosure be limited to the specific embodiments disclosed herein, but that it covers all modifications and alternatives coming within the true scope and spirit of the present disclosure.

What is claimed is:

1. A system for securing a rocket, the system comprising:

a platform with a landing region configured to support the rocket in an upright position after the rocket lands on the landing region;

a plurality of telescoping poles attached to the platform and located around the landing region, wherein the plurality of telescoping poles are configured to extend upward from the platform; and a plurality of cables extending from the plurality of telescoping poles, the plurality of cables comprising at least a first set of cables and a second set of cables, wherein prior to the rocket being located on the landing region, each cable surrounds the landing region, with the first set of cables configured to tighten about the rocket at a first height from the platform and the second set of cables configured to tighten about the rocket at a second height from the platform that is different from the first height.

2. The system of claim 1, wherein each cable of the plurality of cables attaches to two of the plurality of telescoping poles at opposite ends of the respective cable.

3. The system of claim 1, wherein, when the plurality of telescoping poles are extended upward, the first set of cables are moved upward to the first height, and wherein the first height is greater than the second height.

4. The system of claim 1, wherein the plurality of cables comprises four cables.

5. The system of claim 4, wherein two of the four cables are located vertically above the other two of the four cables after tightening about the rocket.

6. The system of claim 1, wherein the plurality of telescoping poles comprises a first telescoping pole, a second telescoping pole, a third telescoping pole, and a fourth telescoping pole, wherein the first set of cables comprises a first cable and a second cable, and wherein the second set of cables comprises a third cable and a fourth cable.

7. The system of claim 6, wherein the first cable and the third cable are coupled with the first telescoping pole and the second telescoping pole, and wherein the second cable and the fourth cable are coupled with the third telescoping pole and the fourth telescoping pole.

8. The system of claim 1, wherein the platform is on a ship.

9. A system for securing a rocket, the system comprising:

a platform configured to support the rocket in an upright position after the rocket lands on the platform;

a plurality of poles positioned around the platform; and a plurality of cables extending from the plurality of poles, with one or more first cables of the plurality of cables configured to tighten about the rocket at a first height and one or more second cables of the plurality of cables configured to tighten about the rocket at a second height that is different than the first height, wherein prior to the rocket being located on a landing region of the platform, each cable surrounds the landing region.

10. The system of claim 9, wherein each cable of the plurality of cables extends from a first pole of the plurality of poles to a second pole of the plurality of poles.

11. The system of claim 9, wherein the plurality of poles are configured to telescope upward.

12. The system of claim 11, wherein the one or more first cables are configured to move upward to the first height in response to the plurality of poles telescoping upward.

13. The system of claim 9, wherein the platform is mobile.

14. A method of preparing to secure a rocket in an upright position on a platform, the method comprising:

attaching a first end of a first cable with a first pole;

extending the first cable from the first pole, around a landing region of the platform, over a portion of the first cable, and toward a second pole;

attaching a second end of the first cable with the second pole;

attaching a first end of a second cable with a third pole;

extending the second cable from the third pole, around the landing region, over a portion of the second cable, and toward a fourth pole; and attaching a second end of the second cable with the fourth pole, wherein, prior to the rocket being located on the landing region, each cable surrounds the landing region.

15. The method of claim 14, further comprising:

attaching a first end of a third cable with the first pole;

extending the third cable from the first pole, around the landing region, over a portion of the third cable, and toward the second pole;

attaching a second end of the third cable with the second pole;

attaching a first end of a fourth cable with a third pole;

extending the fourth cable from the third pole, around the landing region, over a portion of the fourth cable, and toward the fourth pole; and attaching a second end of the fourth cable with the fourth pole.

16. The method of claim 15, wherein the first pole, the second pole, the third pole, and the fourth pole are configured to telescope away from the platform.

17. The method of claim 14, wherein the first pole, the second pole, the third pole, and the fourth pole are configured to telescope away from the platform.

18. The method of claim 14, wherein the platform is mobile and configured to move to an expected landing site of the rocket.

19. The method of claim 14, wherein the first cable is attached with the first pole and the second pole using one or more first elastic cords, and wherein the second cable is attached with the third pole and the fourth pole using one or more second elastic cords.

* * * * *